(12) United States Patent
Higashio (10) Patent No.: US 6,377,359 B1
(45) Date of Patent: Apr. 23, 2002

(54) INFORMATION PROCESSING APPARATUS (75) Inventor: Kimihiko Higashio, Kobe (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/099,695

(22) Filed: Jun. 19, 1998

(30) Foreign Application Priority Data

Jun. 20, 1997 (JP) .............................................. 9-163994

(51) Int. Cl.[7] .......................... B41B 15/00; B41J 15/00; H04N 1/393; H04N 1/40; G06K 9/32
(52) U.S. Cl. ...................... 358/1.2; 358/1.9; 358/1.16; 358/1.17; 358/451; 358/448; 358/447; 382/298
(58) Field of Search ........................ 358/1.2, 1.9, 451, 358/447, 448, 299, 400, 461, 440, 1.16, 1.17; 382/298

(56) References Cited

U.S. PATENT DOCUMENTS 4,947,206 A * 8/1990 Ito ................................ 355/55
5,276,780 A * 1/1994 Sugiura ...................... 358/1.17
6,034,786 A * 3/2000 Kwon ........................ 358/1.2

FOREIGN PATENT DOCUMENTS

| JP | 06-236408 A |   | 8/1994 | ........... G06F/15/40 |
| JP | 06236408 A | * | 8/1994 | ........... G06F/15/40 |

* cited by examiner

*Primary Examiner*—Edward Coles
*Assistant Examiner*—Twyler Lamb
(74) *Attorney, Agent, or Firm*—Morrison & Foester LLP (57) ABSTRACT

Provided is an information processing apparatus which stores and manages image data and is able to output image data in a size equal to the size in the data reading stage independently of the resolutions of an image input device and an image output device. The original size is stored together with the image data in an image data inputting stage. An image output magnification is calculated so as to output an image in a size equal to the size of the original based on the resolution of the image output device and the resolution of the image input device in an image data outputting stage, and enlarged or reduced image data is outputted at the calculated magnification.

13 Claims, 10 Drawing Sheets

50 Image Database

| Index No. | Data Name | Data Path | File Name | Additional Information | | | |
|---|---|---|---|---|---|---|---|
| | | | | Image Size | Resolution | Keyword | ----- |
| 00001 | Data A | C:¥folder | img1.fpx | A4 | 300 | 01 | ----- |
| 00002 | Data B | C:¥folder | img2.jpg | A4 | 150 | 02 | ----- |
| 00003 | Data C | d: | img3.bmp | A5 | 400 | 04 | ----- |
| 00004 | | | | | | | |
| ----- | ----- | ----- | ----- | ----- | ----- | ----- | |

INFORMATION PROCESSING APPARATUS

This application is based on a patent application No.9-163994 filed in Japan, the content of which is incorporated hereinto by reference.

BACKGROUND OF THE INVENTION

The present invention relates to an information processing apparatus and a method for storing and managing image data.

In recent years, the field of information processing has attained a remarkable development, and in particular, personal computers and the like have made rapid progress in terms of performance. Accordingly, the increased use has been made of information processing apparatuses such as image database apparatuses and electronic filing apparatuses for capturing documental and pictorial images by means of an input device, accumulating, managing and retrieving them at need and printing the same by means of an output device not only in the business field and specific applications, but also among general users.

With these information processing apparatuses, the users retrieve desired image data from the accumulated image data and print the retrieved data by means of the output device. However, in this case, the size of the printed image data sometimes becomes not equal to the size of the original. For example, when an image of 20×10 inches in size is read by a scanner having a resolution of 150 dpi (dpi: dots per inch, or the number of pixels per inch), the amount of data of the image data becomes 3000×1500 dots. When this is outputted by a printer having a resolution of 300 dpi, a size of 10×5 inches results in. As described above, in the case where the resolution of the input device when capturing image data and the resolution of the output device when printing the data differ from each other, the size of the original image and the size of the printed image sometimes differ from each other.

In general, a user designates a paper size without recognizing the original size and adjusts the output image size by designating this paper size. That is, the user designates a large paper size when the user wants to output an image in a large size or designates a small paper size when the user wants to output an image in a small size. However, in the case of architectural drawings, mechanical drawings, maps and the like of which the scale is clearly indicated and correctly drawn based on the scale, it is desired to form an output in a size strictly identical to the size of the original.

As a solution to this problem, Japanese Patent Laid-Open Publication No.6-236408 discloses a system in which image data is read and registered while being enlarged or reduced to a standardized size (the size to be registered is referred to as a "registered size"). It is also allowed to attach the information of the size of the original (original size) to the registered image data and select either the registered size or the original size for the formation of an output in the outputting stage. However, this prior art does not at all take the resolutions of the input device and the output device into consideration, but determines the size in the printing stage based on the number of pixels and the original size. In particular, it has an output magnification table which stores therein magnifications in changing the magnification of image data and calculates the size in the printing stage based on the values of the magnification table. The magnifications stored in the output magnification table are set according to the ratio of the input image size to the output image size. Therefore, it is effective in the case where the resolution of the input device or the output device is fixed. However, it becomes ineffective when the resolution of the input device or the output device is varied in a different system.

Lately, there has been announced FlashPix that is a new technique intended for the popularization of image data editing. This is an image data file format developed and proposed through the collaboration of Eastman Kodak Company, Microsoft Corporation, Hewlett-Packard Company and others. This FlashPix format prescribes that an image data file should have image data as well as a variety of information expressing its contents (referred to as "contents information" hereinafter) in order to effectively manage the image data. For example, the FlashPix format prescribes that it should have the information for image data. The information includes the attribute groups comprising of "file source" which describes in detail how the image data has been formed, "intellectual property" which includes the information on ownership and copyright, "content description" which describes the contents of the image data and so on. The image data management according to this FlashPix format is considered to be popular in future. A technique for effectively utilizing the image data conforming to this FlashPix format is now demanded.

SUMMARY OF THE INVENTION

The present invention has been developed to solve the aforementioned problems and has an object to provide an information processing apparatus that stores and manages image data. It makes it possible to output image data in a size equal to the size in the data reading stage independently of the respective resolutions of an image input device and an image output device.

In one aspect of the invention, an information processing apparatus which receives an image data of an original image from an input device, stores and manages the image data; and outputs the image data to an output device, comprises a memory for storing the image data; a determination unit for determining a size of the original image which is to be outputted from said memory to the output device; a calculating unit for calculating a magnification of an image output so that an image size in the output device is identical to the size determined by determination unit; and an image outputting unit for outputting to said output device the image data stored in said memory at a magnification calculated by said calculating unit. Therefore, an output in a size equal to the original size can be formed. Furthermore this apparatus can also cope with the FlashPix format that is considered to be popular in future.

In another aspect of the invention, the information processing apparatus comprises a memory for storing therein an image data, a resolution of the image data and an image size of the image data; a calculating unit for calculating a magnification of an image output so that an image size in the output device is identical to the image size stored in the memory based on a resolution of said output device and the resolution of the image data stored in said memory; and an image outputting unit for outputting to said output device the image data stored in said memory at a magnification calculated by said calculating unit. With this apparatus, an output of a size equal to the original size can be formed.

In a further aspect of the invention, an output device which outputs an image transferred from an information processing apparatus which stores and manages an image, comprises a receiving means for receiving information of the image transferred from the information processing apparatus, a resolution of the image and a size of the image;

a calculating means for calculating a magnification of an image output so as to output an image in a size received by said receiving means based on a resolution of an output device and a resolution of the image received by said receiving means; and an outputting means for outputting the image received by said receiving means at a magnification calculated by said calculating means. The outputting means may be a printing means or a display means. Therefore, an image output in the image size received from the information processing apparatus can be formed.

In a still further aspect of the invention, there is provided a correcting method comprising a step of correcting a magnification of an output image based on (a)a size of an input image, (b)a resolution of the input image, (c)a size of an output image and (d)a resolution of the output image so that the size of said input image and the size of said output image become equal to each other. Therefore, an image output in the size equal to the size of the input image can be formed.

DETAILED DESCRIPTION OF THE PREFERRED EMBODIMENT

A preferred embodiment of the information processing apparatus of the present invention will be described below with reference to the accompanying drawings.

The information processing apparatus in the present embodiment is a database management system for managing image data and additional information which serves as a retrieval key of the image data. The present information processing apparatus stores therein an image size (the term of "size" represents the size of an image determined depending on the longitudinal and lateral lengths. It is different from "resolution" in the present embodiment.) on an original in an input stage as well as the resolution of an input device together with image data when inputting the image data. Hence the information processing apparatus can output image data in the image size in the inputting stage even when there is a difference between the resolution of the input device and the resolution of an output device. The configuration and operation of this information processing apparatus will be described below.

Figure 1:
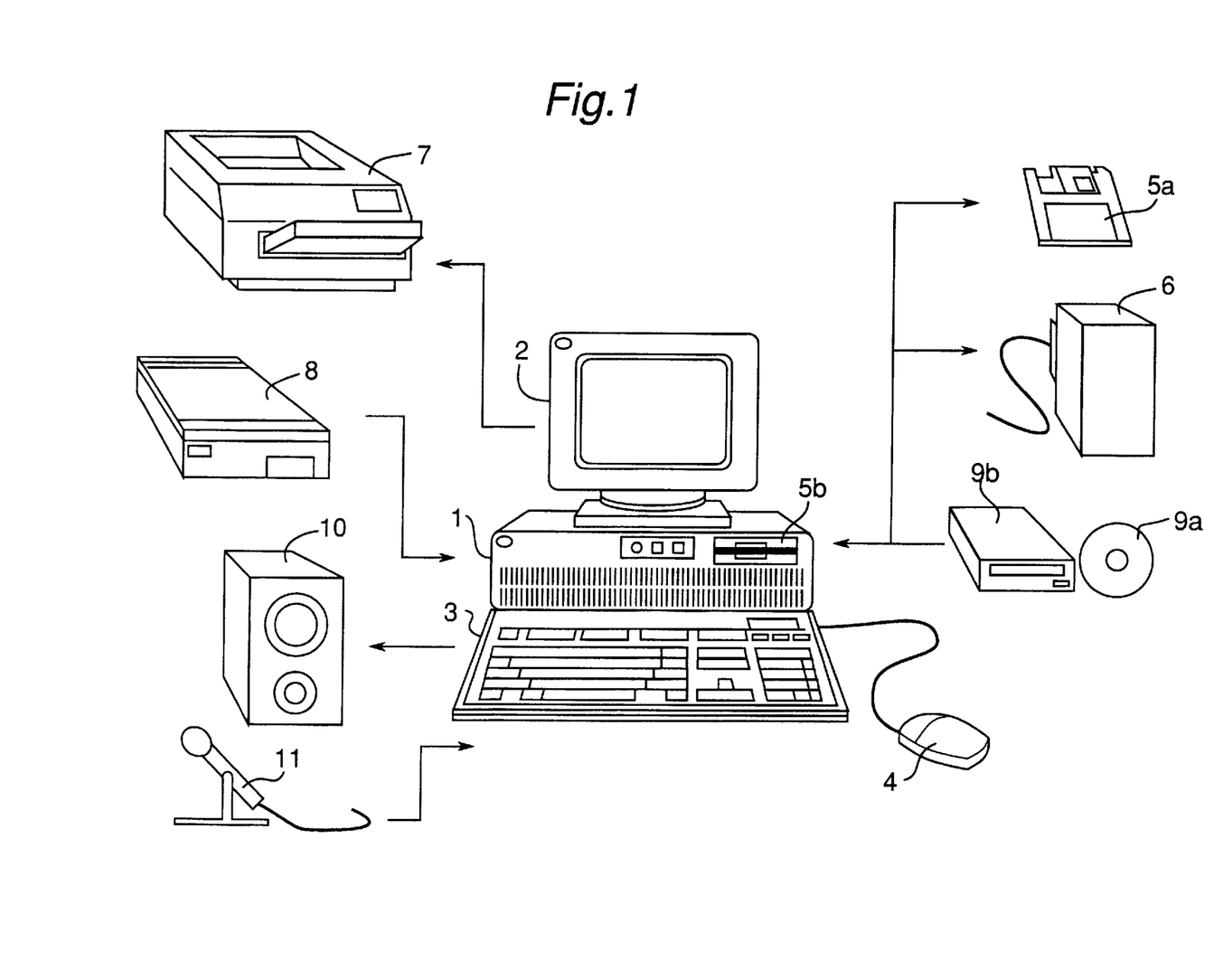
FIG. 1 is a diagram schematically showing the configuration of an information processing apparatus according to an embodiment of the present invention.

FIG. 1 schematically shows the construction of an information processing apparatus (referred to as a "system" hereinafter) of the present embodiment. In FIG. 1, the system is constructed of a control device 1 that is provided with a central processing unit (referred to as a "CPU" hereinafter) and controls the whole system and its peripherals. The CPU may be in the form of, for example, a Pentium processor produced by Intel Corporation or its equivalent. The control device 1 is connected to a display 2 for effecting display of pictorial or literal images, display for operations and so on, a keyboard 3 and a mouse 4 for executing various inputting, instructing and other operations. Further it is connected to, a floppy disk unit 5a and a hard disk unit 6 which serve as data storage media, a printer 7 for printing literal or pictorial image data and so on, a scanner 8 for capturing image data, a CD-ROM unit 9b for reading data stored in a CD-ROM 9a, a loudspeaker 10 for yielding a sound output and a microphone 11 for receiving a sound input.

Figure 2:
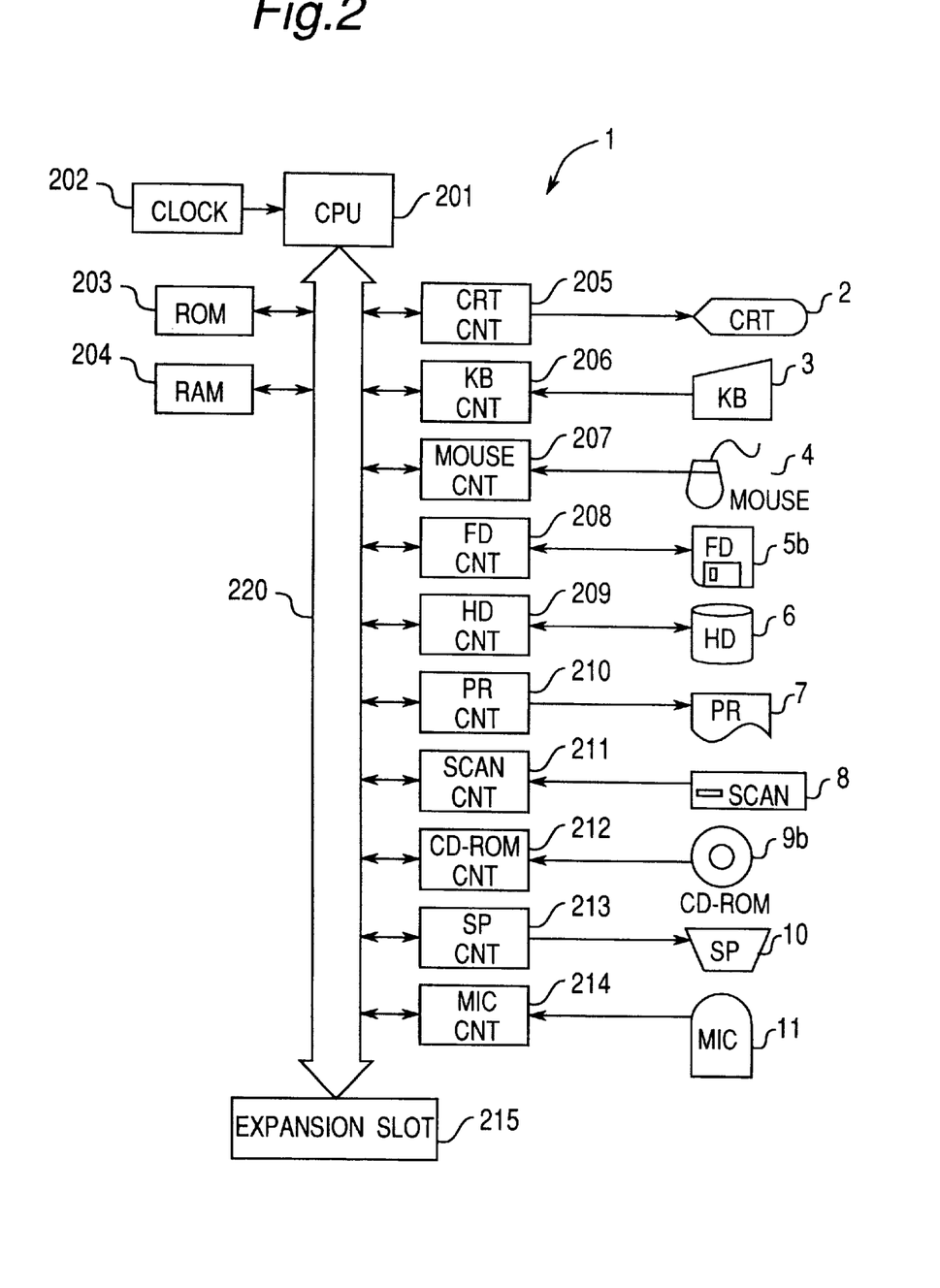
FIG. 2 is a block diagram of a control device and its peripherals.

FIG. 2 shows a block diagram of the present system. The CPU 201 is connected via a data bus 220 to a ROM 203 which stores therein a program for controlling the present system and a RAM 204 which temporarily stores therein a program and data to be executed for control by the CPU 201. The CPU 201 is connected via the data bus 220 to a display control circuit 205 for controlling the display 2 for displaying pictorial or literal images and so on, a keyboard control circuit 206 for controlling the transfer of an input from the keyboard 3, a mouse control circuit 207 for controlling the transfer of an input from the mouse 4, a floppy disk unit control circuit 208 for controlling a floppy disk unit 5b, a hard disk unit control circuit 209 for controlling the hard disk unit 6, a printer control circuit 210 for controlling an output to the printer 7, a scanner control circuit 211 for controlling the scanner 8, a CD-ROM unit control circuit 212 for controlling the CD-ROM unit 9b, a loudspeaker control circuit 213 for controlling the loudspeaker 10 and a microphone control circuit 214 for controlling the microphone 11. The CPU 201 is further connected via the data bus 220 to a clock 202 for generating a reference clock necessary for operating the system and an expansion slot 215 for connecting a variety of expansion boards. Where an SCSII board is inserted in the expansion slot 215, the floppy disk unit 5b, the hard disk unit 6, the scanner 8, the CD-ROM unit 9b or another unit may be connected via this SCSII board.

Although the image data storage media of the floppy disk unit 5a and the hard disk unit 6 are used in the aforementioned system, another information storage medium such as a magneto-optic disk (MO) may be used. Although the scanner 8 is used as an image data input device, another data input device such as a still video camera or a digital camera may be used. Furthermore, although the display 2 and the printer 7 are used as output devices, another output device such as a digital copying machine may be used.

In the present system, the program for implementing the image data management system is stored in the ROM 203. However, part or all of the present program may be stored in the storage media such as the floppy disk unit 5a and the hard disk unit 6 so that the program and data can be read out from the storage media to the RAM 204 and be executed when the necessity arises. Although the present system manages the image data that have been inputted from an external input device and stored into the hard disk unit 6, it can also be considered to directly manage the image data stored in the CD-ROM unit 9b. In this case, index data which serves as data for specifying an image data stored in the CD-ROM unit 9b and a retrieval key attached to the index data are stored into the hard disk unit 6 (a set of the index data and the retrieval key is referred to as a "record"). In retrieving image data, it is proper to firstly extract the record as a retrieval result based on a set retrieval key and thereafter read the desired image data from the CD-ROM unit 9b based on the index data of the extracted record.

Figure 3:
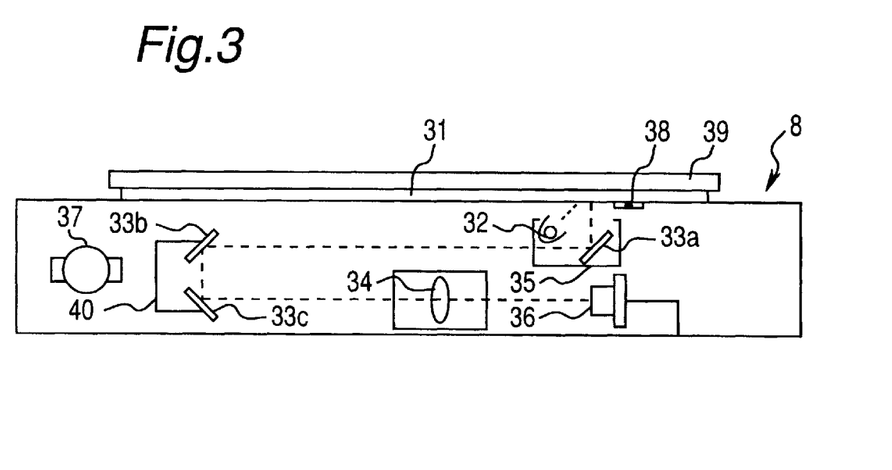
FIG. 3 is a diagram schematically showing the construction of a scanner.

FIG. 3 schematically shows the construction of the scanner 8. The scanner 8 has an original glass 31, a lamp 32, mirrors 33a through 33c, a lens 34, a sensor 36, a first slider 35, a motor 37 and a second slider 40. In this scanner 8, an original placed on the original glass 31 is held down by an original presser 39. The original placed on the original glass 31 is illuminated by the lamp 32, and light reflected from the original is guided to the mirrors 33a through 33c and focused by the lens 34 to form an image on the sensor 36 constructed of a CCD. In this stage, by driving the motor 37, the first slider 35 and the second slider 40 mechanically move at a velocity of v and a velocity of v/2, respectively, in a vertical direction relative to an electrical scanning direction of the sensor 36, thereby scanning the entire surface of the original. The reflected light is converted into image information in the sensor 36 and transmitted to the control device 1. The control device 1 determines only the region of the original from the image read by the scanner 8 and recognizes the same as a rectangular image. The control device 1 recognizes the original size by the longitudinal and lateral lengths recognized in this stage. Then this original size is recorded into the hard disk unit 6 together with the image data.

Figure 4:
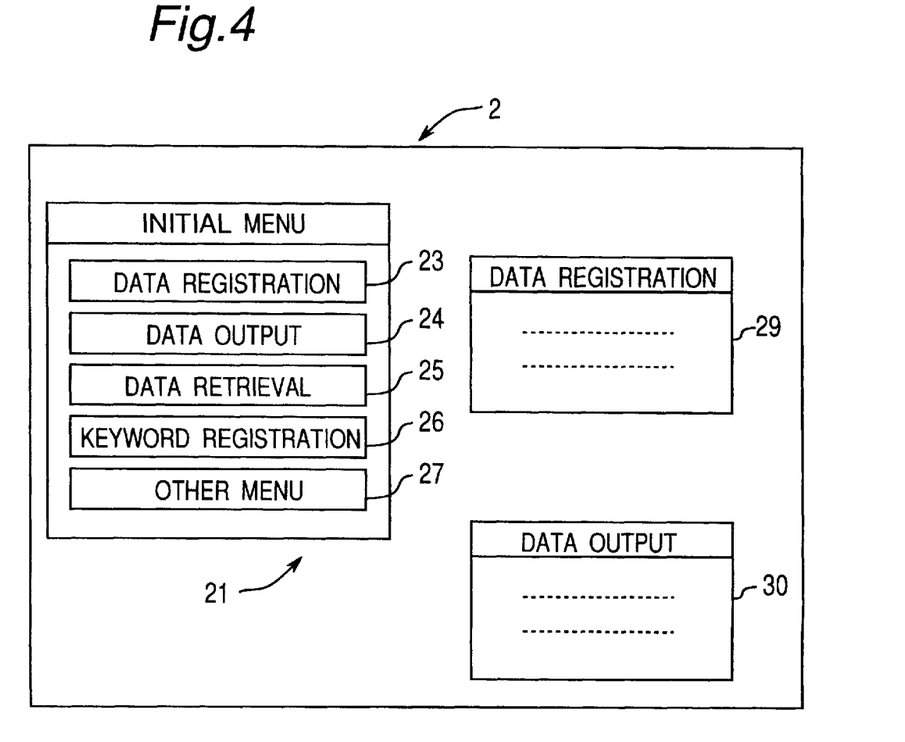
FIG. 4 shows some set-up windows displayed on a display.

FIG. 4 shows an example of some set-up windows displayed on the display 2 in accordance with the execution of the program in this system. In this figure, a window 21 is an initial menu displayed at the start of the system. By selecting one item (icon) from the selection items 23 through 27 of the initial menu window 21, a set-up window corresponding to the processing is displayed. For example, a data registration window 29 is displayed when the "DATA REGISTRATION" 23 is selected, and a data output window 30 is displayed when the "DATA OUTPUT" 24 is selected. The user executes selection between a variety of processes, inputting of setting values and so on via the keyboard 3, mouse 4 and so forth on these setting windows.

Figure 5:
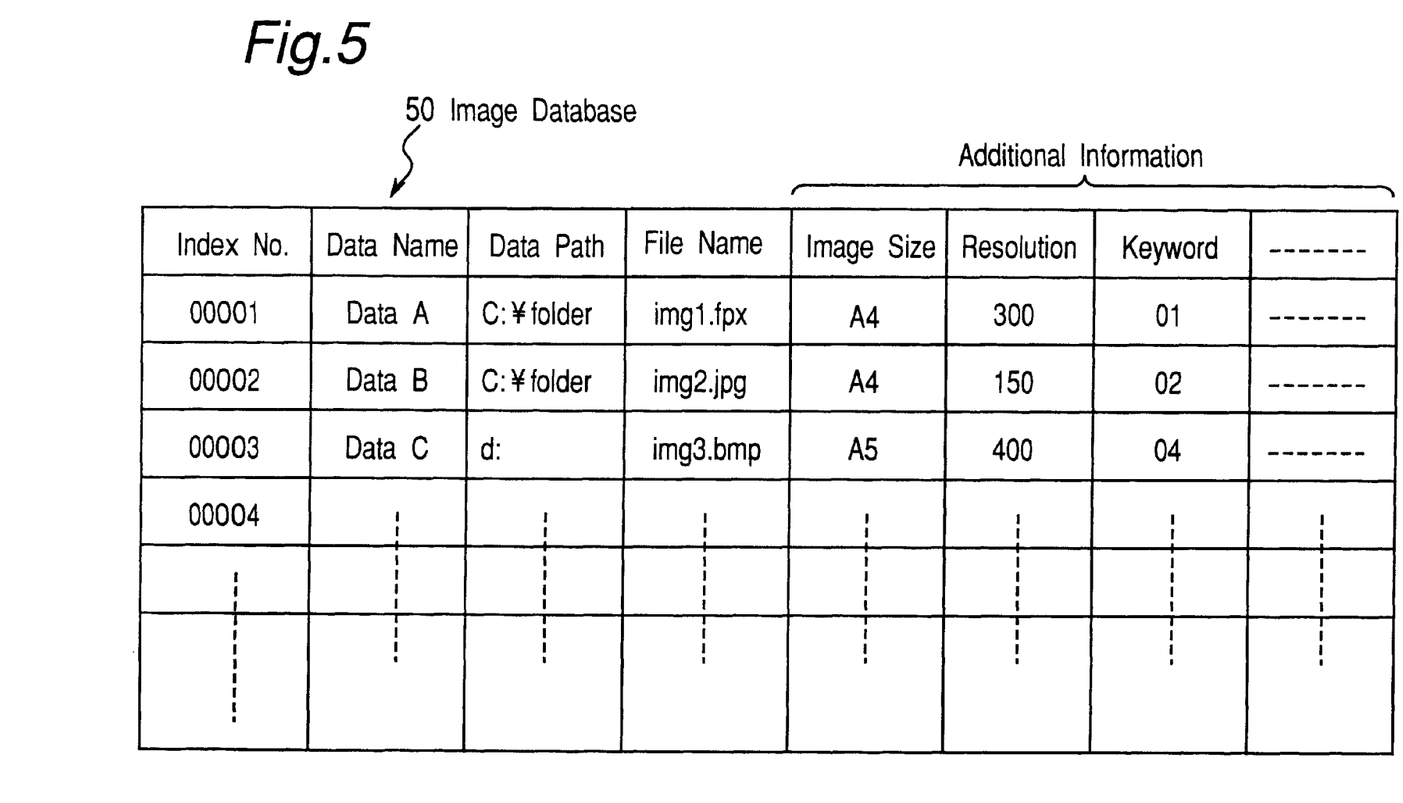
FIG. 5 shows a configuration of an image database stored in a hard disk unit.

The present system is provided with an image database including image data, information on its contents and additional information for managing the image data. The image database is stored in an information storage medium such as the hard disk unit 6. FIG. 5 shows an example of the construction of an image database stored in the hard disk unit 6 of the present system. The image database 50 shown in FIG. 5 has an "Index No." representing a registration number, a "Data Name" representing the contents of image data, a "Data Path" indicating the place on the storage medium in which the image data is stored and a "File Name" of the image data. The image database 50 further includes an "Image Size" that is image data size information, a "Resolution" that is information on the resolution of the input device, a "Keyword" that is a keyword and so on, as the additional information which serves as the retrieval key of the image data.

Figure 6:
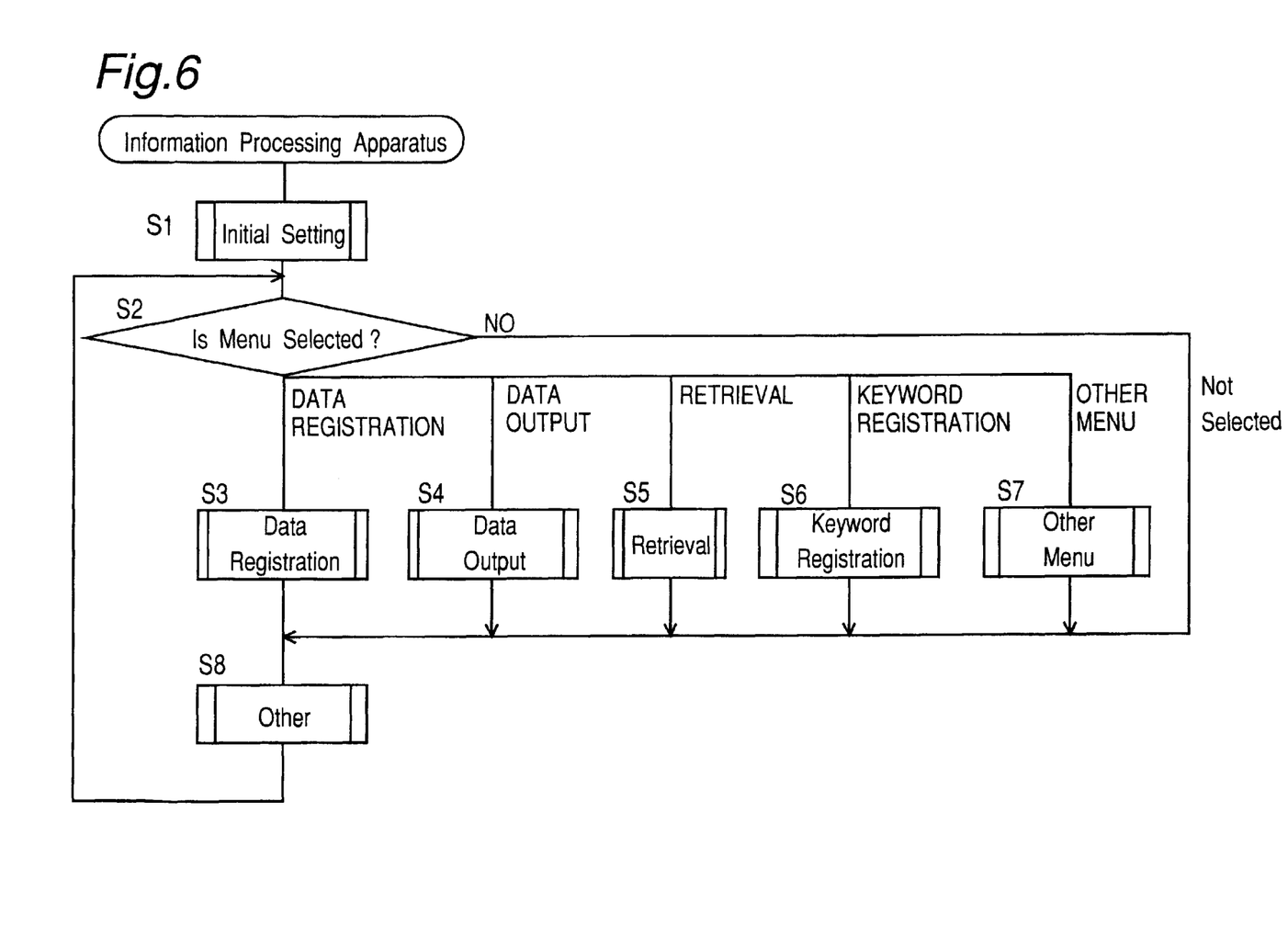
FIG. 6 is a flowchart of the main routine of the control process of a CPU.

The control process of the present system will be described below. FIG. 6 is a flowchart showing the main routine of the control process in the present system. When the present program is started after the power of the system is turned on, firstly the initialization of the flags and so on necessary for the processes and an initial setting process such as display of the initial menu window 21 on the display 2 are executed (S1). Next, it is decided whether or not the selection of a process is executed on the initial window 21 (S2). When the "DATA REGISTRATION" 23 is selected in this case, a data registration process for receiving an image from the image input device such as the scanner 8 and registering the image into the image database 50 with specified information attached to the image is executed (S3). The detail of the data registration process (S3) will be described later. When the "Data Output" 24 is selected, a data output process for printing the image by the image output device such as the printer 7 is executed (S4). The detail of the data output process (step S4) will be described later. When the "DATA RETRIEVAL" 25 is selected, a retrieval process for retrieving the desired image data from the image database 50 is executed (S5). When the "KEYWORD REGISTRATION" 26 is selected, a keyword registration process for registering a keyword to be attached to the image data into the image database 50 is executed (S6). When the "OTHER MENU" 27 is selected, an other menu process is executed (S7). After the above process is completed or when no process is selected in step S2, the a program flow proceeds to step S8. In step S8, other processes are executed, and the program flow returns to step S2 when all the processes are completed. The same operation will be subsequently repeated. The data retrieval process (S5), keyword registration process (S6), other menu process (S7) and other processes (S8) are fundamentally the same as those of the prior art retrieval system and have no direct relation with the present invention, and therefore, no further description is not reiterated for the sake of brevity. The data registration process (step S3) and the data output process (step S4) will be described in detail below.

Figure 7:
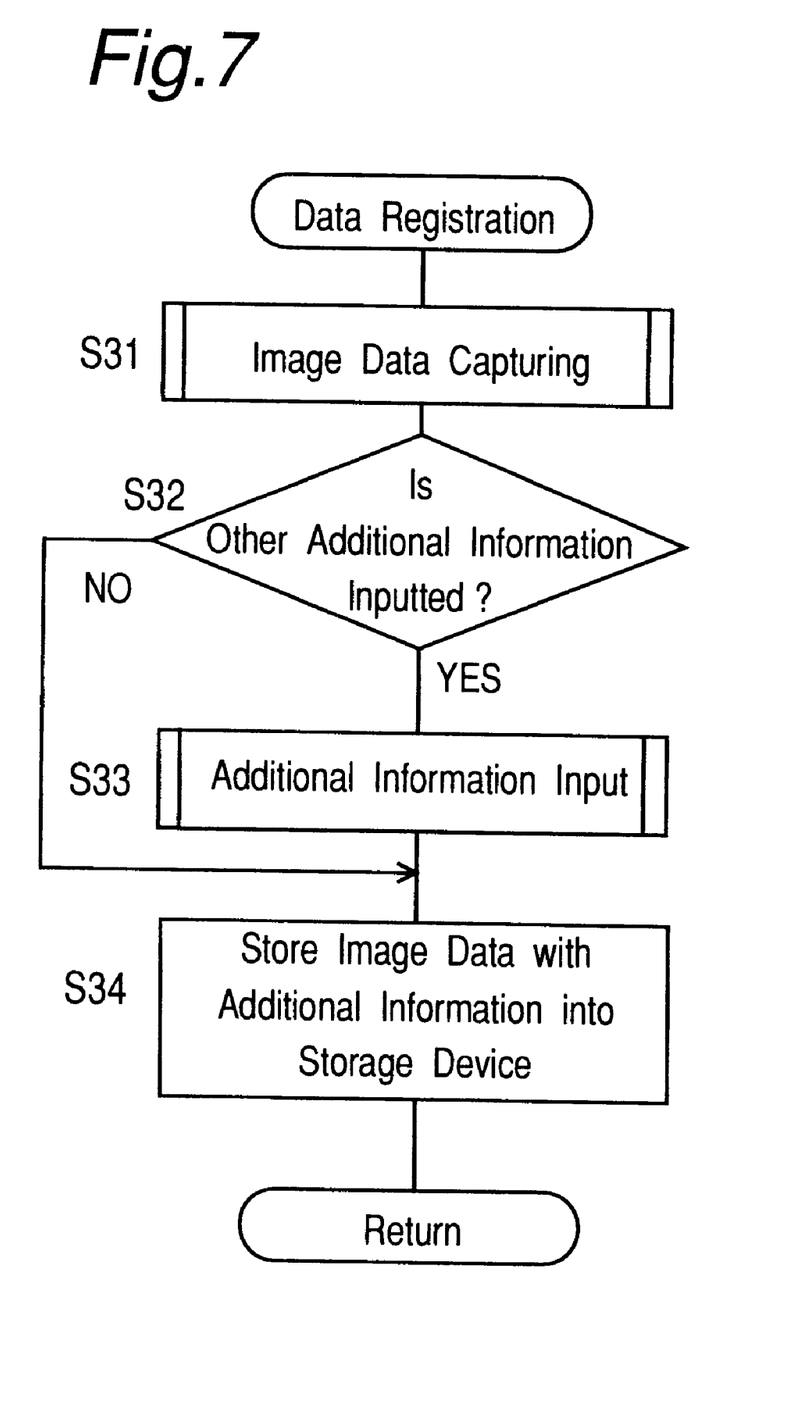
FIG. 7 is a flowchart of a data registration process.

First, the data registration process (step S3) is described with reference to the flowchart of FIG. 7. In the data registration process, an image data capturing process (S31) is firstly executed. The detail of the image data capturing process will be described later. Next, it is decided whether or not other additional information is to be inputted (S32). When other additional information is to be inputted (YES in step S32), an additional information inputting process (S33) is executed, and thereafter the program flow proceeds to S34. The additional information inputting process (S33) will be described later. When no other additional information is inputted (NO in step S32), the program flow proceeds to step S34. In step S34, the image data captured with set additional information are stored into the storage medium such as the hard disk unit 6. In this stage, the image data is stored together with the additional information into the image database 50 on the hard disk unit 6 in the format shown in FIG. 5.

Figure 8:
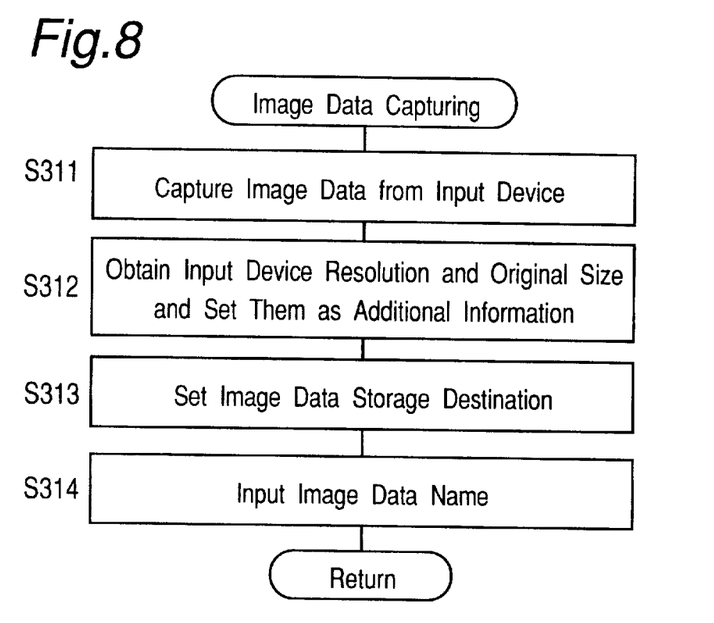
FIG. 8 is a flowchart of an image data inputting process.

The aforementioned image data capturing process (step S31) will be described with reference to the flowchart of FIG. 8. First, image data is captured from the input device such as the scanner 8 (S311). Subsequently, the resolution of the input device and the information of the original size are obtained and used as additional information (S312). When the information of the resolution of the input device and the original size are attached to the image data as in the aforementioned FlashPix format, the information may be taken in. The CPU 201 can also determine the region of the original and obtain the original size from the longitudinal and lateral lengths of the region as stated before. The resolution of the input device and the original size may be set on the window by the user. It is acceptable to obtain the resolution information, the original size and so on from the input device through communications with the input device. As described above, the resolution of the input device and the resolution of the image data are set as additional information (S312). Then a storage destination for the image data is set(S313), and the image data name is inputted(S314). And then the program flow returns.

Figure 9:
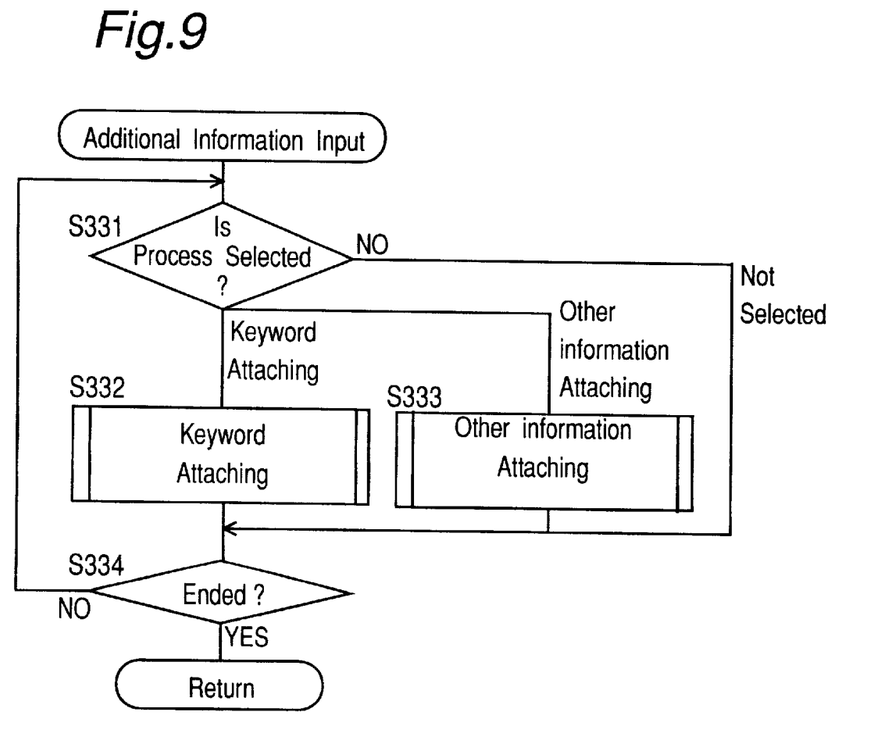
FIG. 9 is a flowchart of an additional information inputting process.

The additional information inputting process (step S33) in the data registration process (step S3) will be described below with reference to the flowchart of FIG. 9. In this process, it is firstly decided whether or not the selection of a process is executed by the user (S331). When the "keyword attaching process" is selected on the window by the user in step S331, a keyword attaching process is executed (S332). The detail of the keyword attaching process (S332) will be described later. When an "other information attaching process" is selected, the other information attaching process is executed (S333). The other information attaching process is fundamentally equivalent to the conventional process and the keyword attaching process in step S332, and therefore, no description is provided of it. After each process is completed or when no process is selected in step S331, it is decided whether or not the inputting of additional information based on the input by the user is to be ended (S334). The program flow returns when the process should be terminated. When the process should not be terminated, the program flow returns to step S331 and the aforementioned processes (S331 through S334) will be repeated.

Figure 10:
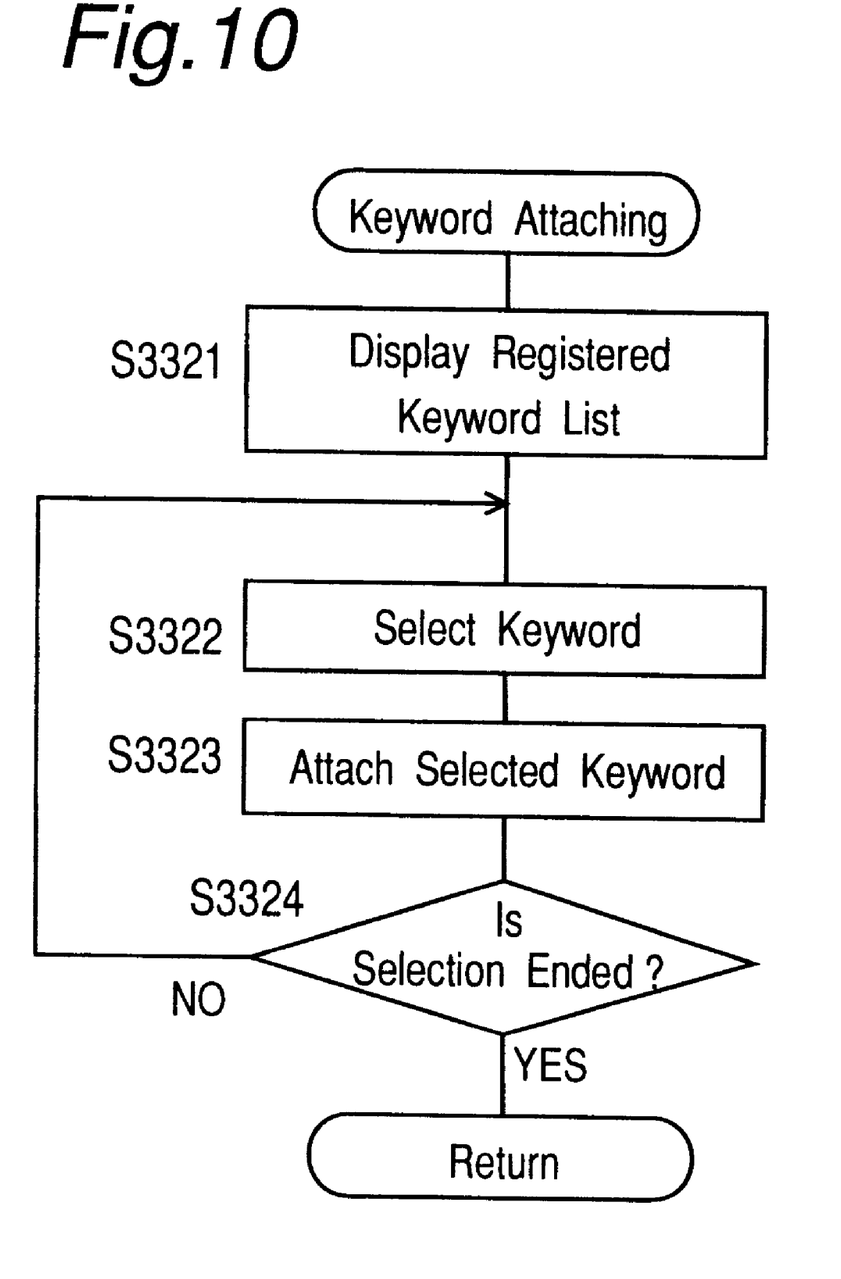
FIG. 10 is a flowchart of a keyword attaching process.

The keyword attaching process (step S332) in the aforementioned additional information inputting process (step S33) will be described below with reference to the flowchart of FIG. 10. In the information processing apparatus of the present embodiment, the keyword that is one of the retrieval information has preliminarily been registered in a keyword management table (not shown). This keyword management table is stored on the storage medium such as the hard disk unit 6. First, the keywords registered in the keyword management table are displayed in a list form (S3321). This displayed list will be referred to as a "registered key list" hereinafter. Next, the keyword designated by the user is selected from the registered key list (S3322). This selected keyword is used as the additional information of the image data (S3323). Subsequently, it is decided whether or not the selection from the registered key list is terminated on the basis of the input on the window by the user (S3324). As a result of the decision, the program flow returns when the process is terminated. Otherwise it goes back to step S3322, and the aforementioned processes (S3322 through S3324) will be repeated.

Figure 11:
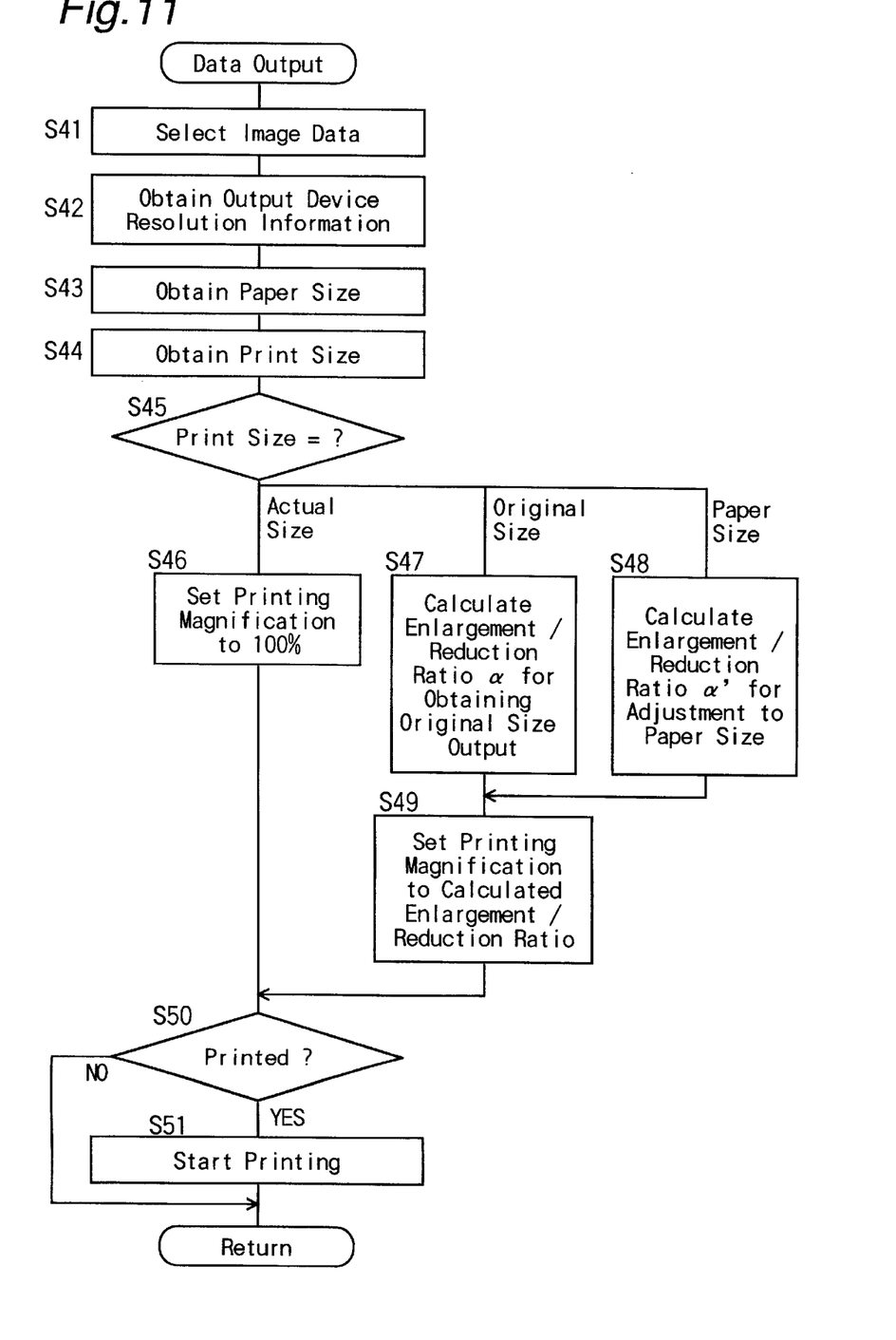
FIG. 11 is a flowchart of a data outputting process.

Next, the data output process (step S4) will be described with reference to the flowchart of FIG. 11. In this process, image data to be printed is selected on the basis of the input on the window by the user (S41). Next, resolution information of the output device is obtained (S42). In this stage, the resolution information of the output device is set on the window by the user. It is also possible to obtain the resolution information, print size and so on from the output device through communications with the output device. Next, paper size information (image size registered in the image database 50) of the image data selected with reference to the image database 50 is obtained (S43). Subsequently, print size information set on the window by the user is obtained (S44). It is defined in this case that the print size is to be set to one of the three types of "actual size", "paper size" and "original size". The obtained print size is discriminated (S45), and the following processing will be executed according to the print size.

First, when the "actual size", is set as the print size, the printing magnification is set to 100% (S46). In this stage, the information processing apparatus outputs the image data as it is without neither enlarging nor reducing the same.

Figure 12:
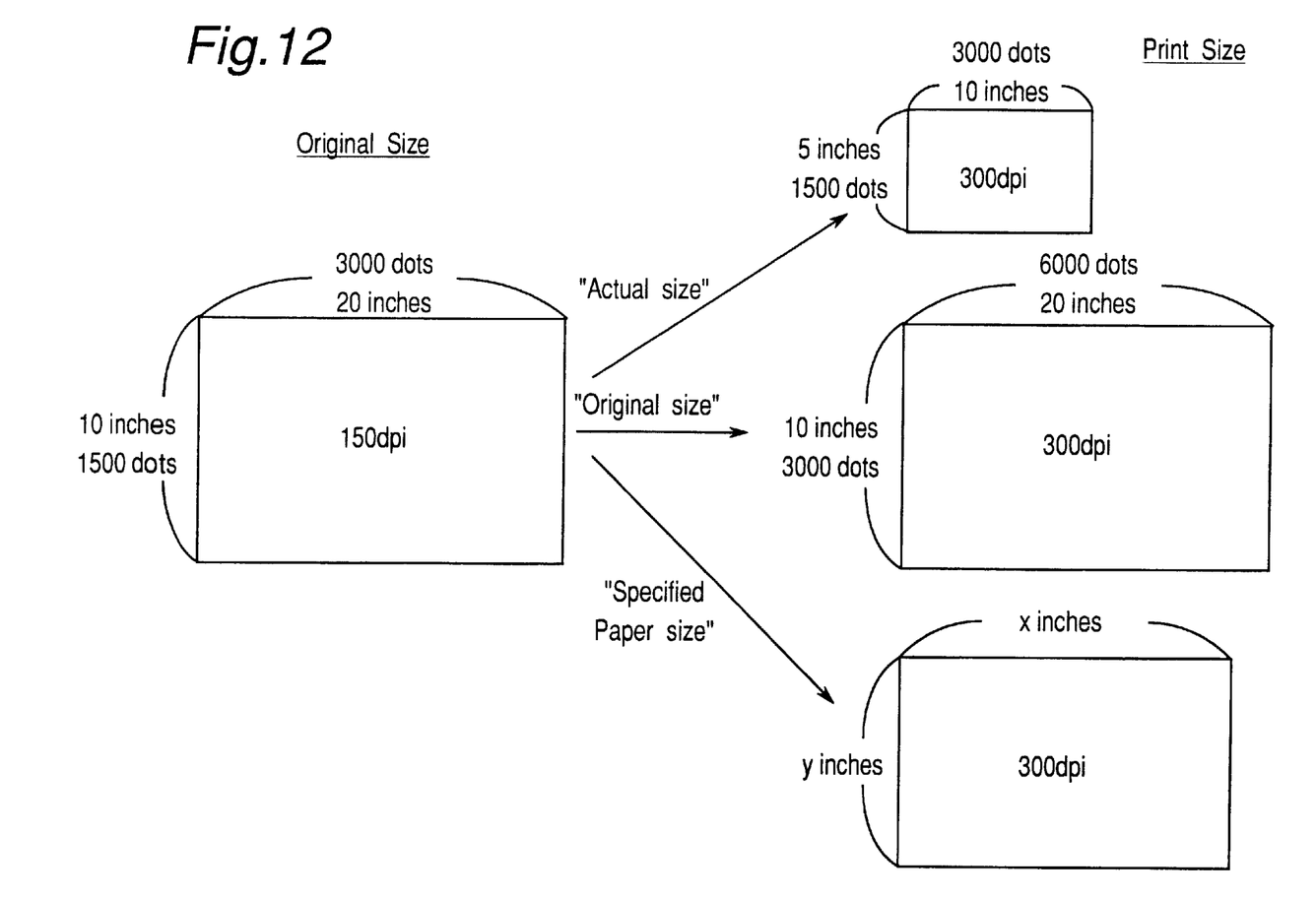
FIG. 12 is a diagram for explaining the relationship between an original size and a print size.

Therefore, the size of the outputted image data depends on the resolution of the output device. For example, in the case of image data of which the original size is 10×20 inches and the number of pixels of the data is 1500×3000 dots, the print size becomes 5 (=1500/300)×10 (=3000/300) inches when the resolution of the output device is 300 dpi. FIG. 12 shows a relationship between the original size and the output paper size in this case. As shown in FIG. 12, the print size becomes different from the original size.

Next, when the "original size" is set as the print size in step S45, an enlargement/reduction ratio $\alpha$ for obtaining an output image in the original size is calculated based on the resolution of the output device and the information on the original size (S47). In this stage, the enlargement/reduction ratio $\alpha$ is calculated according to the following equation.

$$\alpha = \text{Resolution of Output Device/Resolution of Input Device} \times 100(\%) \quad (1)$$

When the resolution of the input device is 150 dpi and the resolution of the output device is 300 dpi, the enlargement/reduction ratio $\alpha$ becomes 200% according to the equation (1). FIG. 12 shows a relationship between the original size and the print size in this case. When the resolution of the output device is 600 dpi, the enlargement/reduction ratio $\alpha$ becomes 400%.

The resolution of the image data is calculated based on the original size in step S47 according to the above description. In the case of the data conforming to the FlashPix format, the resolution of the image data can be obtained from the contents information accompanying the image data.

It is also possible to attach the resolution information of the input device as additional information to the image data and calculate the enlargement/reduction ratio $\alpha$ from the resolution information of the input device and the resolution information of the output device. In this case, the enlargement/reduction ratio $\alpha$ is given by the following equation.

$$\alpha = \text{Resolution of Output Device/Resolution of Input Device} \times 100(\%) \quad (1')$$

Therefore, for example, when the resolution of the input device is 300 dpi and the resolution of the output device is 600 dpi, the enlargement/reduction ratio $\alpha$ becomes 200%. After calculating the enlargement/reduction ratio $\alpha$ (S47), the printing magnification is set to this enlargement/reduction ratio (S49).

Finally, when the "specified paper size" is designated as the print size in step S45, an enlargement/reduction ratio $\alpha'$ for forming an output in the designated specified paper size is calculated (S48). In this case, the enlargement/reduction ratio $\alpha'$ is calculated using the aforementioned ratio $\alpha$ according to the following equation.

$$\alpha' = \beta \alpha (\%) \quad (2)$$

where $\beta$ is the ratio of the original size relative to the printing paper size. For example, assuming that the longitudinal length of the original is 1, the lateral length of the original is m, the longitudinal length of the printing paper is 1' and the lateral length of the printing paper is m', then the resulting image lies off the paper if the longer one of the ratios of length is selected. Therefore, $\beta$ is the smaller one of the ratios of length, and it is expressed by the following equation.

$$\beta = \min(1'/1, m'/m) \quad (3)$$

In this equation, the function min(x,y) is a function for outputting the smaller value of x and y. As described above, the enlargement/reduction ratio α' is calculated (S48), and thereafter the printing magnification is set to this enlargement/reduction ratio (S49).

After setting the printing magnification (S49) as described above, it is decided whether or not printing is to be executed based on the input on the window by the user (S50). When the printing is to be executed (YES in step S50), the printing starts (S51). After printing is completed or when no printing is executed (NO in step S50), the program flow returns.

If the image size is changed to be stored into the image database 50, then the ratio of stored image size to original image size is stored. Thus it is possible to output the image in the original size by setting the printing magnification with reference to the stored ratio in outputting the image.

Although the enlargement/reduction ratio is calculated and the result is outputted to the output device in the aforementioned embodiment, the output device may be provided with such a calculating function. In this case, the image data and the resolution information of the image are outputted to the output device, and the image is enlarged or reduced according to the resolution of the image that the output device has received and the resolution information of the output device itself. Otherwise the calculating function may be incorporated in a driver software which operates in the same control device as that of the present system. The driver software receives the image data and enlarges or reduces the image.

Although, the resolution of the input device and the original size are registered in the database in the aforementioned embodiment. However, it is acceptable to register the original size and the number of pixels of the image data. In this case, the resolution is calculated from the original size and the number of pixels of the image data. For example, if the original size is 10×20 inches and the number of pixels of the image data is 1500×3000 dots, then the resolution becomes 1500/10 =150 dpi.

As described above, the information processing apparatus of the present embodiment calculates the enlargement/reduction ratio for outputting the image in the size in the inputting stage based on the resolution of the image input device for capturing image data and the resolution of the image data or the resolution of the image output device. Then the printing magnification is set from this enlargement/reduction ratio when outputting the captured image data. Therefore, printing in the original size can be easily achieved.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An information processing apparatus which stores and manages an image data and outputs the image data to an output device, the apparatus comprising:
    a memory for storing therein an image data, a resolution of the image data and an image size of the image data;
    a calculating unit for calculating a magnification of an image output so that an image size in the output device is identical to the image size stored in the memory based on a resolution of said output device and the resolution of the image data stored in said memory; and
    an image outputting unit for outputting to said output device the image data stored in said memory at a magnification calculated by said calculating unit.

2. An information processing apparatus according to claim 1, wherein said memory stores a plurality of image data corresponding to a plurality of original images.

3. An information processing apparatus according to claim 2, further comprising a selection unit for selecting an image data to be outputted from the plurality of image data stored in said memory.

4. An information processing apparatus according to claim 1, wherein said output device is a printer, and said calculating unit calculates the magnification so that an image size of the image data printed by said output device is identical to the image size stored in the memory.

5. An information processing method comprising the steps of:
    reading an original document to generate an image data;
    discriminating a size of the original document which is read in said reading step;
    storing the image data into an information storage medium together with the size of the original document;
    calculating a magnification of an image output so as to output the image data in a size identical to the size of the original document based on a resolution of an output image and a resolution of an input image; and
    outputting the image data stored in said information storage medium at said magnification.

6. An information processing method according to claim 5, wherein the original document is read by an image reader in said reading step, the image data is outputted to a printer in said outputting step, and said calculation is executed based on resolutions of the said image reader and printer in said calculating step.

7. An information processing method according to claim 5, wherein said output device is a printer, and said calculating unit calculates the magnification so that an image size of the image data printed by said output device is identical to the image size stored in the memory.

8. A computer program product with executes steps of:
    discriminating an image size of the image data;
    storing the image data into a storage means together with the image size;
    calculating a magnification of an image output so as to output an image data in a size identical to the size of an original based on a resolution of an output image and a resolution of the stored image data; and
    outputting the image data stored in said storage means.

9. A storage medium which stores a computer usable program, the program causing the computer to execute the step of correcting a magnification of an output image based on a size of an input image, a resolution of the input image, a size of an output image and a resolution of the output image so that the size of said input image and the size of said output image become equal to each other.

10. An output device which outputs an image transferred from an information processing apparatus which stores and manages an image, the output device comprising:
    a receiving means for receiving information of the image, a resolution of the image and a size of the image transferred from the information processing apparatus;
    a calculating means for calculating a magnification of an image output so as to output an image in a size received by said receiving means based on a resolution of an output device and a resolution of the image received by said receiving means; and
    an outputting means for outputting the image received by said receiving means at a magnification calculated by said calculating means.

11. An output device according to claim 10, wherein said outputting means may be a printing means.

12. An output device according to claim 10, wherein said outputting means may be a display means.

13. A correcting method comprising a step of correcting a magnification of an output image based on a size of an input image, a resolution of the input image, a size of an output image and a resolution of the output image so that the size of said input image and the size of said output image become equal to each other.

* * * * *